(12) United States Patent
Barzelay et al.

(10) Patent No.: US 11,776,287 B2
(45) Date of Patent: Oct. 3, 2023

(54) DOCUMENT SEGMENTATION FOR OPTICAL CHARACTER RECOGNITION

(71) Applicant: International Business Machines Corporation, Armonk, NY (US)

(72) Inventors: Udi Barzelay, Haifa (IL); Ophir Azulai, Tivon (IL); Inbar Shapira, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 17/241,784

(22) Filed: Apr. 27, 2021

(65) Prior Publication Data
US 2022/0343103 A1    Oct. 27, 2022

(51) Int. Cl.
*G06V 30/148*    (2022.01)
*G06T 3/40*    (2006.01)
*G06N 3/08*    (2023.01)
*G06V 30/413*    (2022.01)
*G06V 30/414*    (2022.01)
*G06V 30/18*    (2022.01)

(52) U.S. Cl.
CPC ............. *G06V 30/153* (2022.01); *G06N 3/08* (2013.01); *G06T 3/40* (2013.01); *G06V 30/18057* (2022.01); *G06V 30/413* (2022.01); *G06V 30/414* (2022.01)

(58) Field of Classification Search
CPC .... G06V 30/10; G06V 30/153; G06V 30/413; G06V 30/414; G06N 3/08; G06T 3/40
See application file for complete search history.

(56) References Cited

U.S. PATENT DOCUMENTS

| | | | |
|---|---|---|---|
| 9,152,883 B2 | 10/2015 | Urbschat | |
| 10,832,046 B1 | 11/2020 | Al-Gharaibeh | |
| 10,997,463 B2* | 5/2021 | Wang | G06V 10/764 |
| 2016/0328630 A1* | 11/2016 | Han | G06V 10/764 |
| 2020/0249306 A1* | 8/2020 | Abdishektaei | G01R 33/565 |
| 2020/0311459 A1 | 10/2020 | Zagaynov | |
| 2021/0150245 A1* | 5/2021 | Liu | G06V 10/56 |
| 2022/0114821 A1* | 4/2022 | Arroyo | G06V 20/62 |

FOREIGN PATENT DOCUMENTS

KR    1020200068073 A    6/2020

OTHER PUBLICATIONS

Kopeykina, et al. (Automatic Privacy Detection in Scanned Document Images Based on Deep Neural Networks), pp. 1-6 (Year: 2019).*

(Continued)

*Primary Examiner* — Daniel G Mariam
(74) *Attorney, Agent, or Firm* — Nicholas Welling

(57) ABSTRACT

An approach to identifying text within an image may be presented. The approach can receive an image. The approach can classify an image on a pixel-by-pixel basis whether the pixel is text. The approach can generate bounding boxes around groups of pixels that are classified as text. The approach can mask sections of an image that where pixels are not classified as text. The approach may be used as a pre-processing technique for optical character recognition in documents, scanned images, or still images.

14 Claims, 7 Drawing Sheets

(56) References Cited

OTHER PUBLICATIONS

"Improving the quality of the output", tessdoc, downloaded from the internet on Feb. 23, 2021, 9 pages, <https://tesseract-ocr.github.io/tessdoc/ImproveQuality.html>.

"Tesseract Open Source OCR Engine (main repository)", GitHub, downloaded from the internet on Feb. 23, 2021, 5 pages, <https://github.com/tesseract-ocr/tesseract>.

Farahmand et al., "Document Image Noises and Removal Methods", Proceedings of the International MultiConference of Engineers and Computer Scientists (IMECS) 2013, Mar. 13-15, 2013, Hong Kong, 5 pages.

Gupta et al., "Muti-Stage Framework to Boost Optical Character Recognition Performance on Low Quality Document Images", provided by the inventors in disclosure last updated Feb. 23, 2021, 5 pages.

Henry, Tiphaine, "Building a robust, fast, and scalable text extractor for business automation", Final Year Internship Report—IBM Research, Mar. 1, 2019-Aug. 31, 2019, 32 pages.

Mell et al., "The NIST Definition of Cloud Computing", Recommendations of the National Institute of Standards and Technology, NIST Special Publication 800-145, Sep. 2011, 7 pages.

\* cited by examiner

DOCUMENT SEGMENTATION FOR OPTICAL CHARACTER RECOGNITION

TECHNICAL FIELD

The present invention relates generally to optical character recognition, and more specifically, to document segmentation for text extraction.

BACKGROUND

Documents and images can consist of unstructured data, within the unstructured data human readable text may be present. Once scanned, the image can consist of noise that can make it difficult for optical character recognition programs to determine text sections from background sections of the image. Information extraction from digital documents consists of storing image embedding characters into a machine readable format. The characters can be numbers, words, or sentences. In most information extraction systems, two stages are required: document segmentation and optical character recognition. Document segmentation is the process of distinguishing those sections of an image that contain text from other sections of the image that do not contain text. Deep learning techniques are currently used to differentiate between portions of an image that do or do not contain text down to the pixel level. Many of these techniques utilize neural networks.

BRIEF SUMMARY

According to an embodiment of the present invention, a computer-implemented method, computer system, and computer program product for document segmentation. Embodiments may include training a model to detect text within the image, with a plurality of synthesized noisy images containing text receiving an input image. Embodiments may further include detecting text within the image, based on the trained model. Further, embodiments may include generating one or more bounding boxes around the detected text. Additionally, embodiments may include masking one or more sections of the image outside of the bounding boxes.

Other aspects and embodiments of the present invention will become apparent from the following detailed description, which, when taken in conjunction with the drawings, illustrate by way of example the principles of the invention.

DETAILED DESCRIPTION

Figure 1:
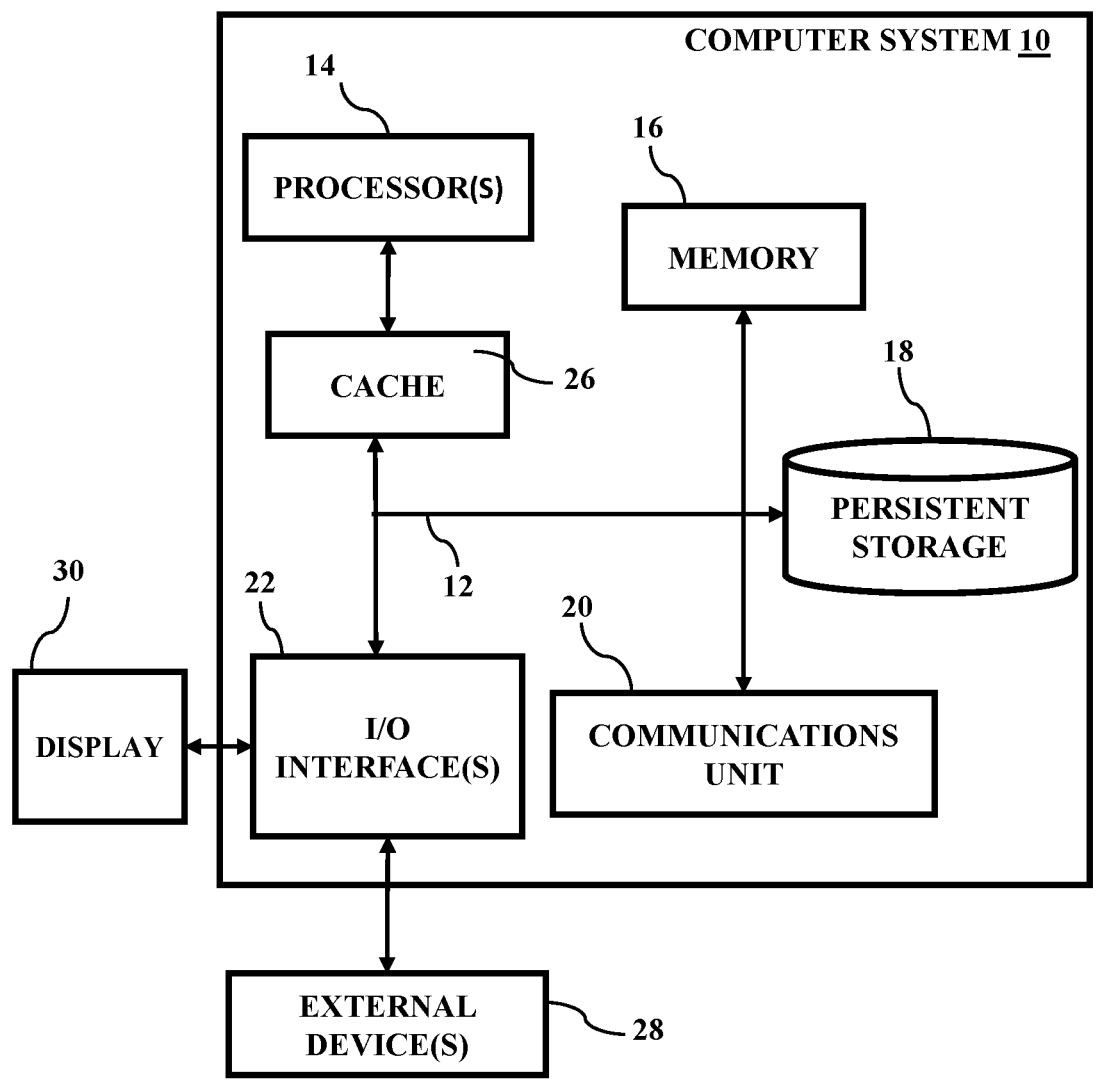
FIG. 1 is a block diagram of internal and external components of a data processing system in which embodiments described herein may be implemented, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of a document segmentation model. It should be noted that the term software, as used herein, includes any type of computer instructions such as, but not limited to, firmware, microcode, etc.

Embodiments of the present invention provide a technique of preprocessing an image for optical character recognition, by document segmentation. Document segmentation may be required to distinguish between pixels representing the background (i.e., the background of a document in which text is printed onto) and pixels representing the text (i.e., characters). For example, when a document is scanned, the scanned document may be askew or the scanner may have been dirty, thus resulting in a blotchy or unclear image. A text detection model may be applied to the document to analyze the image at a pixel by pixel level. Upon analyzing the image at the pixel level, bounding boxes can be generated around those pixels determined to be text. The areas of the image determined not to be text are masked (i.e., the areas are blacked out and not available for an OCR engine to read).

Embodiments of the present invention can detect text within a noisy image. The text can be detected within noisy images, where conventional text detection systems fail to differentiate between sections of images that include text and sections that are background or otherwise do not include text. Many text detection systems are based on deep learning models, for example a convolutional neural network with a sliding window operation, resulting in feature embeddings for sections of the image. However, convolutional neural networks fail to propagate the embeddings back to the full size image with pixel by pixel mapping. Embodiments of the present invention generate a segmentation map from a succession of convolutional blocks bringing the image to a lower dimension to examine its features.

In another embodiment, a system includes a processor and logic integrated with the processor, executable by the processor, or integrated with and executable by the processor. The logic is configured to perform the foregoing computer-implemented method.

In another embodiment, a computer program product for document segmentation includes a computer-readable storage medium having program instructions embodied therewith. The program instructions are executable by a computer to cause the computer to perform the foregoing computer-implemented method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts computer system 10, an example computer system representative of server computer 402 and client computer 406 (described further below with reference to FIG. 4). Computer system 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses.

Computer system 10 includes processors 14, cache 26, memory 16, persistent storage 18, communications unit 20, input/output (I/O) interface(s) 22 and communications fabric 12. Communications fabric 12 provides communications between cache 26, memory 16, persistent storage 18, communications unit 20, and input/output (I/O) interface(s) 22. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM). In general, memory 16 can include any suitable volatile or non-volatile computer readable storage media. Cache 26 is a fast memory that enhances the performance of processors 14 by holding recently accessed data, and data near recently accessed data, from memory 16.

Program instructions and data used to practice embodiments of the present invention may be stored in persistent storage 18 and in memory 16 for execution by one or more of the respective processors 14 via cache 26. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links. Program instructions and data used to practice embodiments of the present invention may be downloaded to persistent storage 18 through communications unit 20.

I/O interface(s) 22 allows for input and output of data with other devices that may be connected to each computer system. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 22. I/O interface(s) 22 also connect to display 30.

Display 30 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
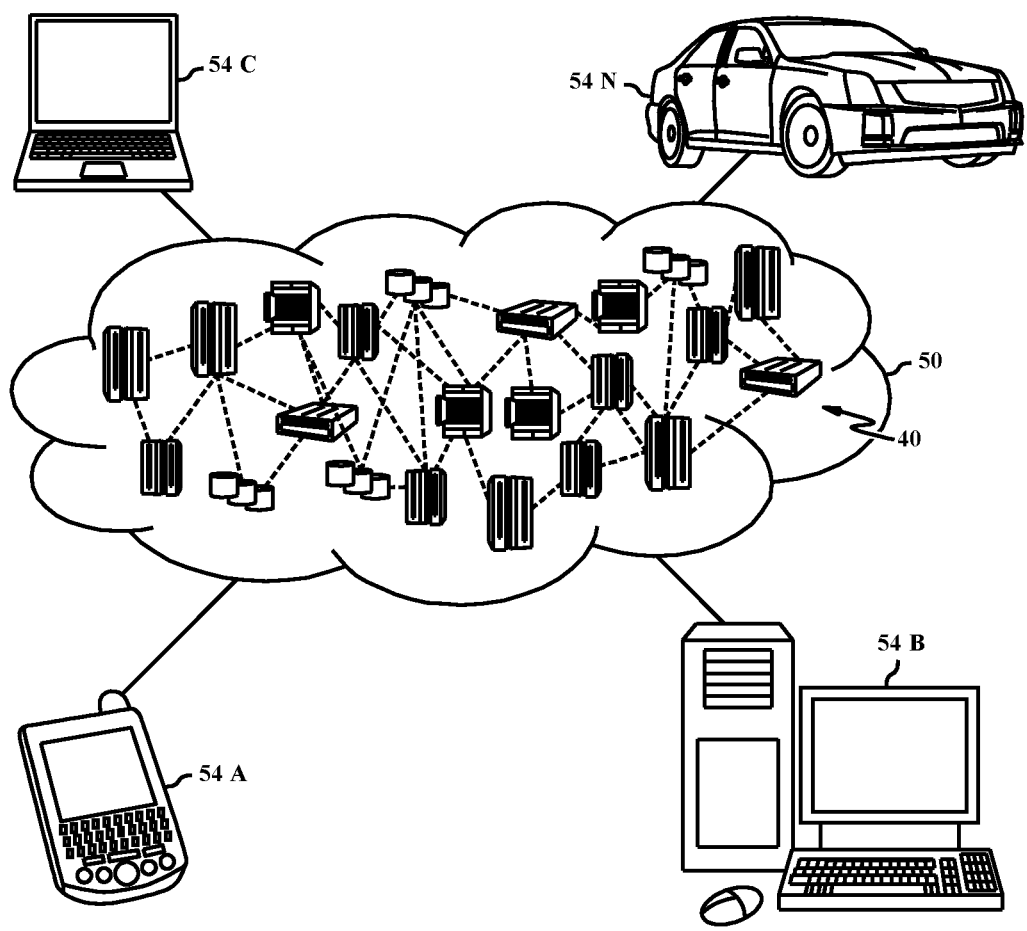
FIG. 2 depicts a cloud computing environment, according to embodiments of the present invention.

Referring now to FIG. 2, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 40 and cloud computing environment 50 can communicate with any type of computerized device over any type of network and/or network addressable connection (e.g., using a web browser).

Figure 3:
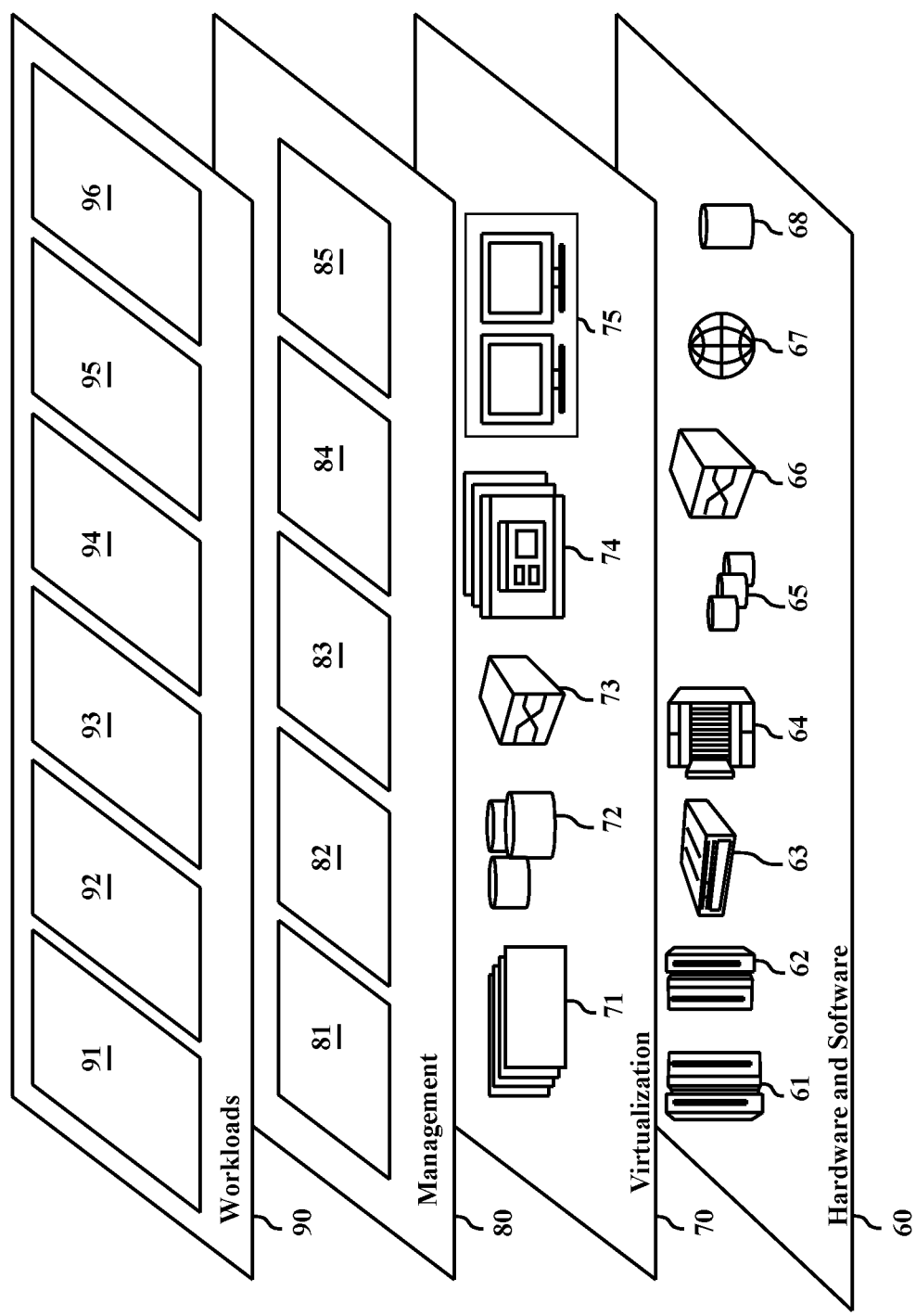
FIG. 3 depicts abstraction model layers, according to embodiments of the present invention.

Referring now to FIG. 3, a set of functional abstraction layers provided by cloud computing environment 50 (depicted in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and text extraction 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 4:
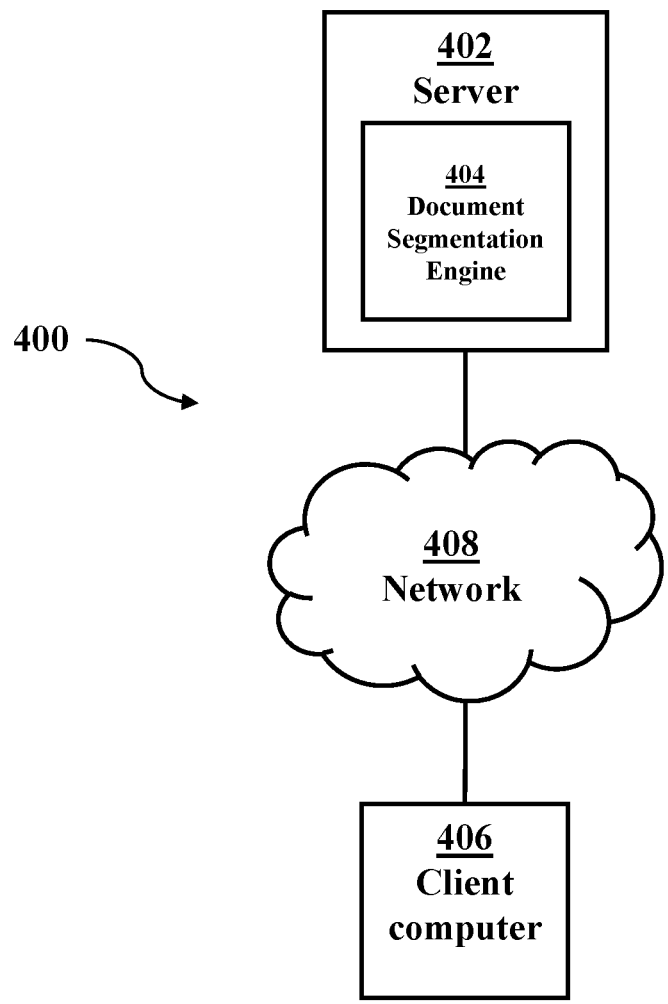
FIG. 4 is a high level system architecture, according to embodiments of the present invention.
Figure 6:
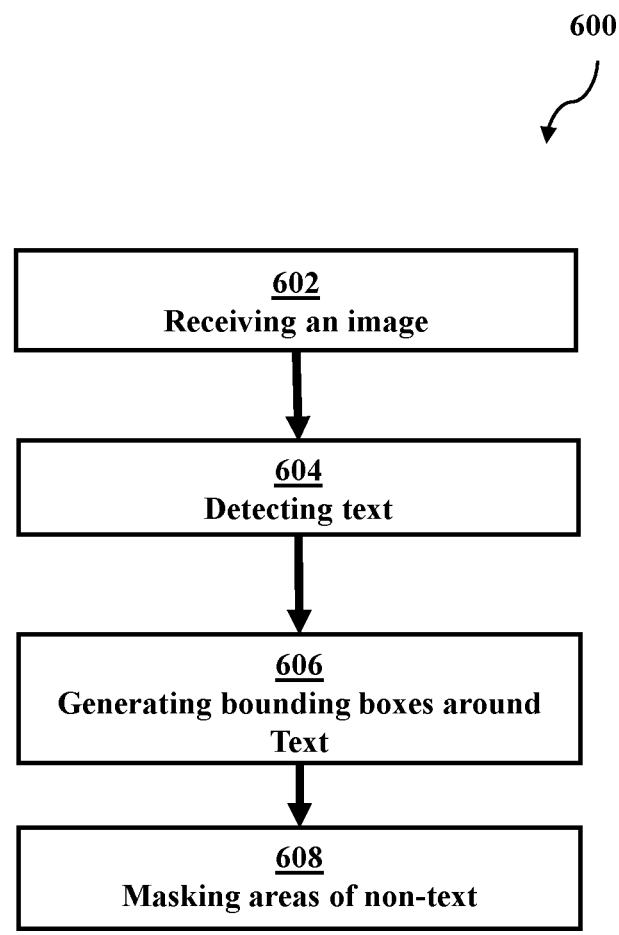
FIG. 6 is a flowchart of a method for document segmentation, according to embodiments of the present invention.

FIG. 4 is a high-level architecture for performing various operations of FIG. 6, in accordance with various embodiments. The system architecture 400 may be implemented in accordance with the present invention in any of the environments depicted in FIGS. 1-4, among others, in various embodiments. Of course, more or less elements than those specifically described in FIG. 4 may be included in system architecture 400, as would be understood by one of ordinary skill in the art upon reading the present descriptions.

Each of the steps of the method 600 (described in further detail below with reference to FIG. 6) may be performed by any suitable component of system architecture 400. A processor, e.g., processing circuit(s), chip(s), and/or module(s) implemented in hardware and/or software, and preferably having at least one hardware component may be utilized in any device to perform one or more steps of the method 600 in system architecture 400. Illustrative processors include, but are not limited to, a central processing unit (CPU), an application specific integrated circuit (ASIC), a field programmable gate array (FPGA), etc., combinations thereof, or any other suitable computing device known in the art.

System architecture 400 includes a block diagram showing an exemplary processing system for predicting inference times for a machine learning model environment to which principles of the invention may be applied. System architecture 400 comprises a client computer 406, a document segmentation engine 404 operational on a server computer 402, and a network 408 supporting communications between client computer 406 and server computer 402.

Client computer 406 can be any computing device on which software is installed for which an update is desired or required. In an embodiment, client computer 406 can be a standalone computing device, management server, a web server, a mobile computing device, or any other electronic device or computing system capable of receiving, sending, and processing data. In other embodiments, client computer 406 can represent a server computing system utilizing multiple computers as a server system. In another embodiment, client computer 406 can be a laptop computer, a tablet computer, a netbook computer, a personal computer, a desktop computer or any programmable electronic device capable of communicating with other computing devices (not shown) within system architecture 400 via network 408.

In another embodiment, client computer 406 represents a computing system utilizing clustered computers and components (e.g., database server computers, application server computers, etc.) that act as a single pool of seamless resources when accessed by document segmentation engine 404 of system architecture 400. Client computer 406 can include internal and external hardware components, as depicted, and described in further detail with respect to FIG. 1.

In an embodiment, server computer 402 can be a standalone computing device, management server, a web server, a mobile computing device, or any other electronic device or computing system capable of receiving, sending, and processing data. In other embodiments, server computer 402 can represent a server computing system utilizing multiple computers as a server system. In another embodiment, server computer 402 can be a laptop computer, a tablet computer, a netbook computer, a personal computer, a desktop computer, or any programmable electronic device capable of communicating with document segmentation engine 404 of system architecture and other computing devices (not shown) via network 408.

Network 408 can be, for example, a local area network (LAN), a wide area network (WAN) such as the Internet, or a combination of the two, and can include wired, wireless, or fiber optic connections. In general, network 408 can be any combination of connections and protocols that will support communications between client computer 406 and server computer 402.

Document segmentation engine 404, operational on server computer 402, can perform document segmentation on images to detect text within the image. For example, document segmentation engine 404 may receive an image from an imaging device (e.g., scanner, camera, camera phone, webcam, etc. . . . ) (not shown). Document segmentation engine 404 can automatically detect text within an image based on a neural network architecture. The neural network architecture of document segmentation engine 404 can be trained to classify successively smaller sections of the image down to the pixel as text or non-text. Document segmentation engine 404 can then generate bounding boxes around the sections of the image that have been classified as text. Additionally, document segmentation engine 404 can automatically group pixels classified as text as characters, words, or sentences. Document segmentation engine 404 can then mask the sections of the image that have not been classified as text. Once the image has been masked, document segmentation engine 404 can send the grouped pixels to an optical character recognition (OCR) engine (e.g., tesseract OCR) for further processing.

Figure 5:
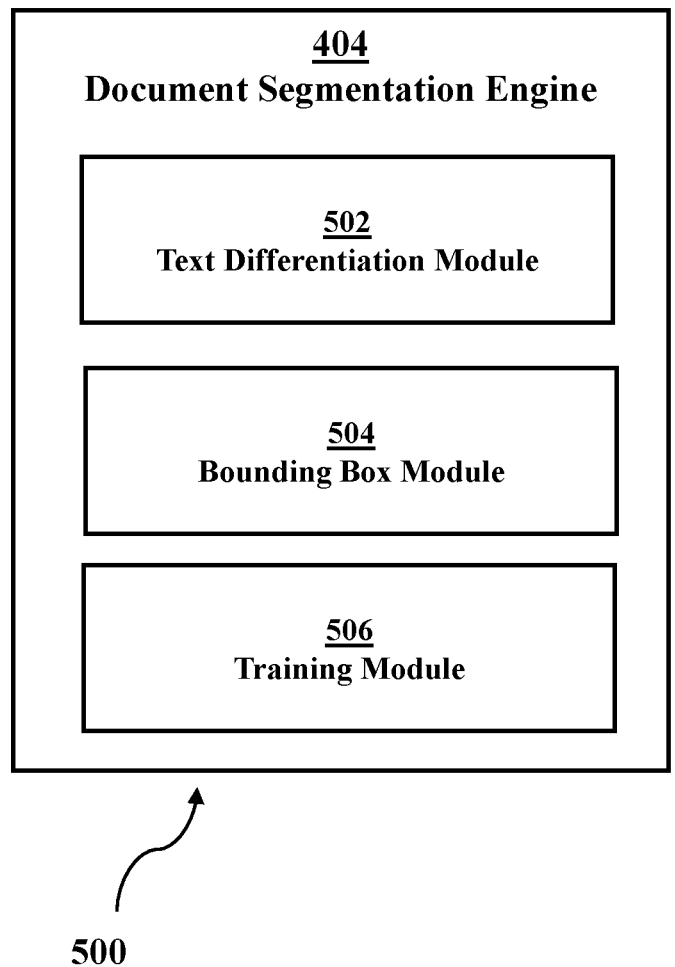
FIG. 5 is an exemplary detailed architecture of a document segmentation engine, according to embodiments of the present invention.

FIG. 5 is an exemplary detailed architecture for performing various operations of FIG. 6, in accordance with various embodiments of the present invention. System architecture 400 may be implemented in accordance with the present invention in any of the environments depicted in FIGS. 1-4, among others, in various embodiments. Of course, more or less elements than those specifically described in FIG. 4 may be included in system architecture 400, as would be understood by one of skill in the art upon reading the present descriptions.

Text differentiation module 502 is a computer module that classifies sections of an image as text or non-text. Text differentiation module 502 can have a neural network architecture that can be configured to receive images and predict if text is present within the image. In an embodiment, text differentiation module 502 may have a convolutional neural network with a sliding window operation that successively takes smaller portions of an image to reduce the dimensionality of the image. For example, the sliding window for a square image 1024 pixels×1024 pixels may perform a first convolution with a window that is 512 pixels×512 pixels that moves over 64 pixels per step. Then, in a second convolution, the window would be 256 pixels×256 pixels and 128 pixels per step. In a third convolution, the window would be 128 pixels×128 pixels and 256 pixels per step, and so forth.

In an embodiment, text differentiation module 502 can accept images of any size. If an image is larger than the input size of the convolutional neural network, text differentiation module 502 slices the image into square tiles that are fed into the convolutional neural network. For example, if an image is 2048 pixels×2048 pixels, text differentiation module 502 can slice the image into four separate square tiles of 1024 pixels×1024 pixels. In some embodiments, text differentiation module 502 slices the image in the immediate example into nine 1024 pixel×1024 pixel tiles. The nine pixel tiles contain portions of the same content as neighboring tiles, thus ensuring that those portions of the 4 tiles of the previous example fail to include a portion of the original image (i.e. an overlap tile strategy).

In another embodiment, text differentiation module 502 can perform a pooling operation (e.g., max-pooling or spatial pyramidal pooling block) in between each convolution to reduce dimensionality of the input image in order to conserve computing resources. For example, in the immediate above example, a max-pooling operation of 2×2 may be used after each of the convolutions, thus allowing for feature extractions within each of the sub-regions of the sliding windows. A sub-region is a section an image undergoing a pooling operation that is undergoing the reduction in dimensions, for example, in an 8×8 pixel image reduced by a 2×2 pooling operation, each 2×2 pixel quadrant of the image would be considered a sub-region. Pooling operations allow for text of any scale to be targeted. For example, a word in font size 40 would have a similar pooling number as the same word in font size 10, albeit in different levels of the convolutional process.

In another embodiment, text differentiation module 502 can perform a rectified linear unit at the final convolution, for example 32×32 pixel filter. Additionally, for a 1024×1024 pixel image or tile, features may be selected for the image corresponding to whether text is present for a pixel in the image resulting in a final probability the pixel is part of text. Once each pixel has received a probability corresponding to its pixel classification, the final convolution can be up sampled an equal amount of times as it was convoluted down in the same sequence but in reverse. Additionally, text differentiation module 502 can copy and concatenate the resulting convolution from the step with the same convolutions (as described in further detail below with respect to FIG. 7). After upsampling to the final convolutional layer, text differentiation module generates a segmentation map for the image. Upsampling is the process of reverting the image back to its original dimensions, based on the location of the maxima from the max-pooling operation.

Bounding box module 504 is a computer module that can receive the output of text differentiation module 502, generate bounding boxes around pixels that make up words determined to be text, and mask sections of an image that are not classified as text. In an embodiment, bounding box module 504 can automatically predict which pixels should be grouped together to form one or more characters, words, or sentences. For example, if pixels inside the letter "O" are not classified as text, bounding box module 504 will place a bounding box around the exterior of the letter but not in the interior because of predictive capabilities (e.g., a trained neural net model). Additionally, bounding box module 504 can determine if text is askew on a page (e.g., if the document turned or became misaligned during scanning), based on the slant or angle of the pixels classified as text. In this scenario, bounding box module 504 may determine the document had been misaligned and adjust the bounding boxes accordingly.

In an embodiment, bounding box module 504 can place bounding boxes at word segmentation level. Bounding box module 504 can determine characters based on the pixel classification. Bounding box module 504 can then determine if the characters are grouped together as a word based on the connections and spacing between pixels classified as text. Once bounding box module 504 has determined the pixels are grouped as a word, bounding box module 504 can place a bounding box around the word as a quadrilateral box. It should be noted the quadrilateral will have a small buffer of pixels (e.g., 5 or 6) not classified as text within the bounding box.

In some embodiments, bounding box module 504 can mask pixels in an image not classified as text. For example, if an image has noisy sections (e.g., dirt on a scanner, crinkles or wrinkles in the document from scanning, additional ink from a spill, or poor lighting), bounding box module 504 can mask the sections on a word by word basis, rather than attempting to place a bounding box around an entire sentence or line.

Training module 506 is a computer module that can train a model to detect text in an image. In an embodiment, training module 506 can synthesize noisy images with text to use for training purposes. For example, training module 506 may have predetermined text which it can place overtop of preexisting images in multiple directions. The preexisting images may be splotchy or the result of a dirty scanner or they can be from a stock corpus of images. The text may be changed in color and font. Training module 506 may flatten the text while noting the coordinates of the text. Training module 506 may feed the synthesized noisy images into a document segmentation model (e.g., a convolutional neural network including a Unet) and the parameters document segmentation model may be optimized to classify the noisy images at a pixel by pixel basis.

Each of the steps of the method 600 (described in further detail below with reference to FIG. 6) may be performed by any suitable component of system architecture 400. A processor, e.g., processing circuit(s), chip(s), and/or module(s) implemented in hardware and/or software, and preferably having at least one hardware component, may be utilized in any device to perform one or more steps of the method 600 in system architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 500 provides a detailed view of at least some of the modules of system architecture 400. Architecture 500 can comprise a document segmentation engine 404, which can further comprise a text differentiation module 502 and a bounding box module 504.

FIG. 6 is an exemplary flowchart of a method 600 for detecting text in an image. At step 602, an embodiment can receive, via document segmentation engine 404, an image. At step 604, the embodiment can detect text within the image, via text differentiation module 502. At step 606, the embodiment can generate bounding boxes around the detected text, via bounding box module 504. At step 608, the embodiment can mask the areas of the image not within bounding boxes, via bounding box module 504, the list of architectures for selection.

Figure 7:
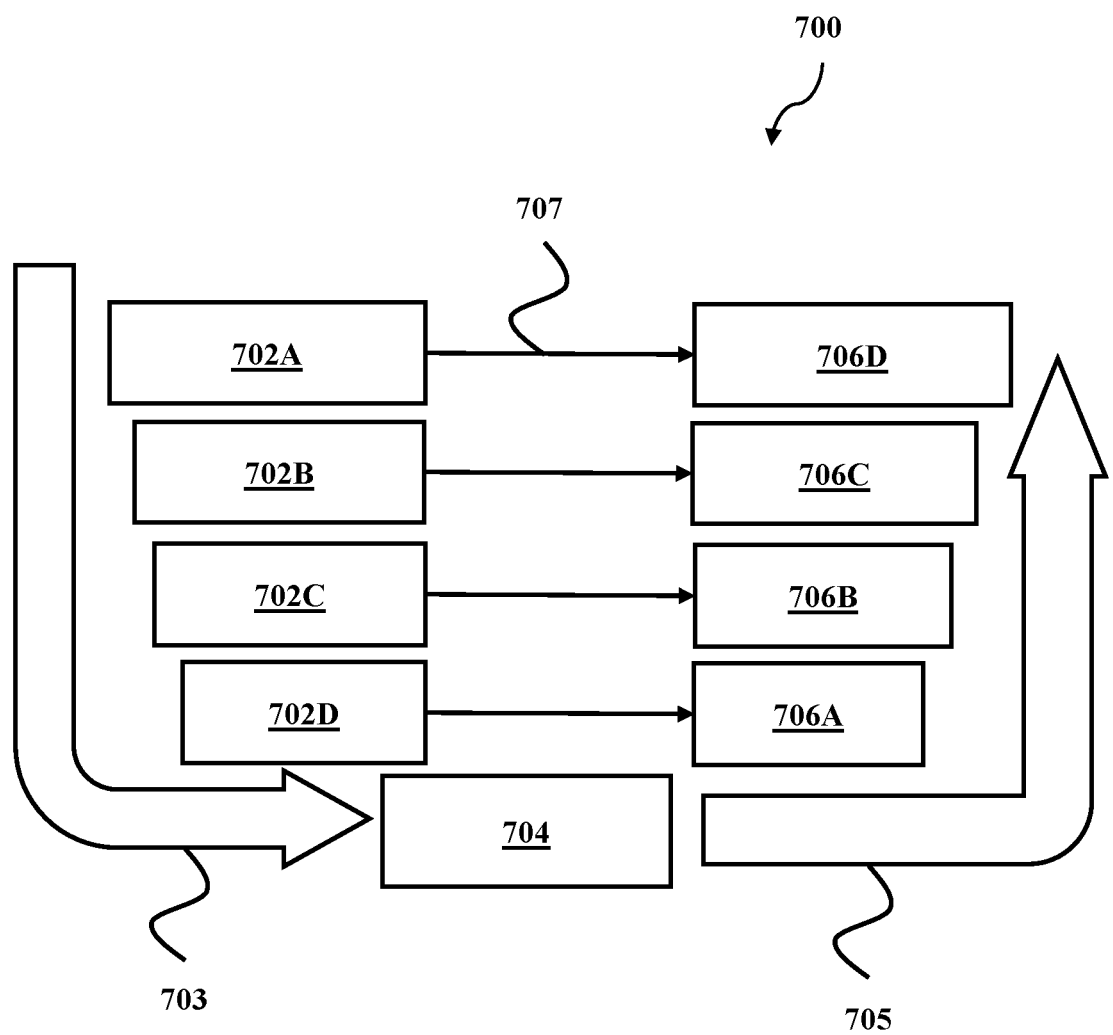
FIG. 7 is an exemplary Unet neural network architecture body, according to embodiments of the present invention.

FIG. 7 depicts an exemplary Unet architecture 700, in accordance with an embodiment of the present invention. A Unet is a convolutional neural net architecture. It is a fully convolutional network. In an embodiment, text differentiation module 502 can have a Unet model that is configured to classify pixels of an image as text or not-text. The Unet architecture can be trained using real or synthesized images or scanned document images with or without text. Contracting layers 702A, 702B, 702C, and 702D represent successive layers of convolutional operations (e.g., sliding window) and down sampling (e.g., max pooling). Contracting layers 702A, 702B, 702C, and 702D can also have a rectified linear unit and/or softmax operation performed at every layer. Arrow 703 represents the direction which the output from the previous layers operation is input into the successive layer in the contracting layers. Central block 704 is the lowest level of dimension extraction for the input image. Central block 704 represents the feature detection for each pixel in the image, once all contracting operations of layers 702A, 702B, 702C, and 702D have been performed. Arrow 705 represents the direction successive outputs are input into each corresponding block. Expanding layers 706A, 706B, 706C, and 706D represent successive layers of convolutions and up sampling. Arrow 707 represents layer concatenation. Each layer in Unet architecture 700 has a corresponding layer. As shown in FIG. 7, the corresponding block from the contracting layers correspond to an expanding layer (e.g., layer 702A corresponds to layer 706D.) The same operation performed in layer 702A will be performed in layer 706D, but in reverse, and with the output of layer 702A and 706C as the input of layer 706D. The final output of layer 706D is a per pixel probability estimate, representing the probability that the pixel is part of segmented text.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting text within an image, the computer-implemented method comprising:
    training, by a processor, a model to detect text within the image, with a plurality of synthesized noisy images containing text, wherein the model comprises a Unet convolutional neural network architecture;
    receiving, by the processor, an input image;
    generating, by the processor, a pixel probability estimate for each pixel in the input image, based at least in part on the Unet convolutional neural network architecture, wherein the probability estimate is the probability a pixel is part of a segmented text;
    generating, by the processor, a segmentation map based at least in part on the per pixel probability estimate for each pixel in the input image;
    generating, by the processor, one or more bounding boxes around the detected text, based at least in part on the segmentation map; and
    masking, by the processor, one or more sections of the input image outside of the bounding boxes.

2. The computer-implemented method of claim 1, wherein the model is based on a neural network architecture.

3. The computer-implemented method of claim 2, wherein the neural network architecture is a convolutional neural network architecture.

4. The computer-implemented method of claim 1, further comprising:
    sending, by the processor, the masked image to an optical character recognition (OCR) engine.

5. The computer-implemented method of claim 4, wherein the OCR engine is based on a tesseract OCR engine.

6. A computer program product for detecting text within an image, the computer program product comprising:
    one or more non-transitory computer readable storage media and program instructions stored on the one or more non-transitory computer readable storage media, the program instructions comprising program instructions to:
        train a model to detect text within the image, with a plurality of synthesized noisy images containing text, wherein the model comprises a Unet convolutional neural network architecture;
        receive an input image;
        generate a pixel probability estimate for each pixel in the input image, based at least in part on the Unet convolutional neural network architecture, wherein the probability estimate is the probability a pixel is part of a segmented text;
        generate a segmentation map based at least in part on the per pixel probability estimate for each pixel in the input image;
        generate one or more bounding boxes around the detected text, based at least in part on the segmentation map; and
        mask one or more sections of the input image outside of the bounding boxes.

7. The computer program product of claim 6, wherein the model is based on a neural network architecture.

8. The computer program product of claim 7, wherein the neural network architecture is a convolutional neural network architecture.

9. The computer program product of claim 6, further comprising instructions to:
    send the masked image to an optical character recognition (OCR) engine.

10. The computer program product of claim 9, wherein the OCR engine is based on a tesseract OCR engine.

11. A computer system for detecting text within an image, the computer system comprising:
    one or more computer processors;
    one or more computer readable storage media; and
    program instructions stored on the one or more computer readable storage media for execution by at least one of the one or more processors, the program instructions comprising:
        train a model to detect text within the image, with a plurality of synthesized noisy images containing text, wherein the model comprises a Unet convolutional neural network architecture;
        receive an input image;
        generate a pixel probability estimate for each pixel in the input image, based at least in part on the Unet convolutional neural network architecture, wherein the probability estimate is the probability a pixel is part of a segmented text generate a segmentation map based at least in part on the per pixel probability estimate for each pixel in the input image;
        generate one or more bounding boxes around the detected text, based at least in part on the segmentation map; and
    mask one or more sections of the input image outside of the bounding boxes.

12. The computer system of claim 11, wherein the model is based on a neural network architecture.

13. The computer system of claim 11, further comprising instructions to:
    send the masked image to an optical character recognition (OCR) engine.

14. The computer system of claim 13, wherein the OCR engine is based on a tesseract OCR engine.

* * * * *